United States Patent
Min et al.

(10) Patent No.: US 7,489,618 B2
(45) Date of Patent: Feb. 10, 2009

(54) POSITION DETECTION SYSTEM OF PROBE-BASED DATA STORAGE APPARATUS AND POSITION DETECTION METHOD

(75) Inventors: Dong-ki Min, Seoul (KR); Seung-bum Hong, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 535 days.

(21) Appl. No.: 10/851,671

(22) Filed: May 24, 2004

(65) Prior Publication Data

US 2005/0007900 A1    Jan. 13, 2005

(30) Foreign Application Priority Data

May 22, 2003    (KR)    ............... 10-2003-0032555

(51) Int. Cl.
*G11B 7/00*    (2006.01)
(52) U.S. Cl. ..................................... 369/126
(58) Field of Classification Search ................. 369/100, 369/126, 44.27, 44.28, 44.26, 275.3, 44.34
See application file for complete search history.

(56) References Cited

U.S. PATENT DOCUMENTS

| | | | | |
|---|---|---|---|---|
| 5,053,995 A | * | 10/1991 | Kajimura et al. | 369/126 |
| 5,453,970 A | * | 9/1995 | Rust et al. | 369/126 |
| 5,471,458 A | * | 11/1995 | Oguchi et al. | 369/126 |
| 5,506,829 A | * | 4/1996 | Yagi et al. | 369/126 |
| 5,581,538 A | * | 12/1996 | Inui et al. | 369/126 |
| 5,835,477 A | * | 11/1998 | Binnig et al. | 369/126 |
| 5,856,967 A | * | 1/1999 | Mamin et al. | 369/126 |

* cited by examiner

*Primary Examiner*—Nabil Z Hindi
(74) *Attorney, Agent, or Firm*—Sughrue Mion, PLLC

(57) ABSTRACT

A position detection system of a data storage apparatus and a position detection method. The position detection system includes a recording medium including a plurality of servo fields and data fields, in a case where n×m data bits are formed on each of the data fields, and a probe array including H servo probes that scan the servo fields. An absolute position of a data bit can be detected by one-to-one correspondence. In addition, the servo regions can be disposed among the data regions, and the data probes can be used as the servo probes.

21 Claims, 9 Drawing Sheets

POSITION DETECTION SYSTEM OF PROBE-BASED DATA STORAGE APPARATUS AND POSITION DETECTION METHOD

BACKGROUND OF THE INVENTION

This application claims priority from Korean Patent Application No. 2003-32555, filed on May 22, 2003, in the Korean Intellectual Property Office, the disclosure of which is incorporated herein in its entirety by reference.

1. Field of the Invention

The present invention relates to a position detection system using scanning probe microscopy (SPM) technology of a data storage apparatus, and a position detection method performed by the position detection system.

2. Description of the Related Art

In a position detection system using scanning probe microscopy (SPM) technology, methods of detecting positions using a probe include methods of detecting relative positions of data areas after setting a reference position, and methods of detecting absolute positions of the data areas.

U.S. Pat. Nos. 4,956,817, 5,241,527, 5,257,024, 5,278,704, 5,589,686, and 5,744,799 disclose relative position detecting methods for moving a single probe from a reference position toward a desired position by calculating the number of patterns on a surface of a recording medium having regular patterns such as electric patterns, magnetic patterns, or surface patterns. However, if, in a relative position detection method, the number of patterns is miscalculated or the patterns cannot be read due to an external disturbance, the desired position must be detected again from the reference position. Therefore, the time required for detecting the position increases and the time required for recording and reproducing information also increases. Also, if the pattern is damaged, errors may accumulate when moving to the desired position, a medium forming the patterns and a medium recording/reproducing the information may be different from each other due to an error in the manufacturing process. If the error is generated on the patterns, it is difficult to correct the error.

In a method of detecting absolute position, a position of a data bit is determined by differences in electrostatic capacitances of an electrostatic capacitance sensor connected to a probe, without using the probe directly. This method has high sensitivity, however, and an error between an actual position and the position corresponding to the electrostatic capacitance is large due to non-linearity of a sensor and non-linearity of a spring supporting the recording medium.

SUMMARY OF THE INVENTION

The present invention provides a position detection system of a data storage apparatus that detects information in a data area using scanning probe microscopy (SPM) technology in an absolute position detecting method, and a position detecting method, which corrects an error in a servo code using the above system.

Also, the present invention provides a position detection system of a data storage apparatus, in which a data probe can be used as a servo probe, and a position detection method, which is able to record and/or reproduce information and detect servo information simultaneously using the above system.

According to an aspect of the present invention, there is provided a position detection system of a data storage apparatus, the position detection system including: a recording medium including a plurality of data fields and H servo fields if (n×m) data bits are formed on one data field; and a probe array including a plurality of data probes that scan the data fields to detect information and H servo probes that scan servo fields, wherein each of the data fields includes n×m data bits and H satisfies $H \geq \log_2 (n \times m)$.

According to another aspect of the present invention, there is provided a position detection system of a data storage apparatus, the position detection system including: a recording medium including a plurality of data fields and Q servo fields if a data field, on which (n×m) data fields are formed, is divided into $2^r$ virtual subsections and accordingly, (n'×m') data bits are allocated to each of the virtual subsections; and a probe array including a plurality of data probes that scan the data fields to detect information and Q servo probes that scan the servo fields, wherein each of the data fields includes n×m data bits and is divided into $2^r$ virtual subsections that include n'×m' data bits, and Q satisfies $Q \geq \log_2(n' \times m') = \log_2(n \times m) - r$.

According to still another aspect of the present invention, there is provided a position detection system of a data storage apparatus, the position detection system including: a recording medium including a plurality of data fields; and a probe array including a plurality of data probes that scan the data fields to detect information, wherein each of the data fields includes data regions, in which data bits are formed, and servo regions, in which servo bits are formed, and each of the data probes scans the data fields to detect the data bits and the servo bits.

According to yet still another aspect of the present invention, there is provided a position detection method performed by a position detection system, which includes a recording medium including a plurality of data fields, each of which includes n×m data bits, and a probe array including a plurality of data probes that scan the data fields to detect information, the method including: (a) forming H servo fields in the recording medium, and disposing H servo probes that scan the servo fields in the probe array; (b) detecting a servo code, which represents information about a position of each of the data fields, from the servo field using the servo probe; and (c) moving the data probes to the position on the data field that corresponds to the servo code, wherein H satisfies $H \geq \log_2 (n \times m)$.

According to yet still another aspect of the present invention, there is provided a position detection method performed by a position detection system, which includes a recording medium including a plurality of data fields, each of which includes n×m data bits, and a probe array including a plurality of data probes that scan the data fields to detect information, the method including: (a) dividing each of the data fields into $2^r$ virtual data subsections such that n'×m' data bits are included in each of the virtual subsections, forming Q servo fields in the recording medium, and disposing Q servo probes that scan the servo fields in the probe array; (b) detecting a servo code, which represents information about a position of each of the data fields, from each of the servo fields using the servo probe; and (c) moving the data probe to the position on the data field that corresponds to the servo code, wherein Q satisfies $Q \geq \log_2(n' \times m') = \log_2(n \times m) - r$.

According to yet still another aspect of the present invention, there is provided a position detection method performed by a position detection system, which includes a recording medium including a plurality of data fields and a probe array including a plurality of data probes that scan the data fields to detect information, the method including: (a) arranging data regions, in which data bits are formed, and servo regions, in which servo bits are formed, in the data field; (b) detecting a servo code, which represents position information on the data region, from each of the servo regions using the data probe;

and (c) moving the data probe to the position on the data field that corresponds to the servo code.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, exemplary embodiments of the present invention will be described in detail with reference to the accompanying figures.

Figure 1A:
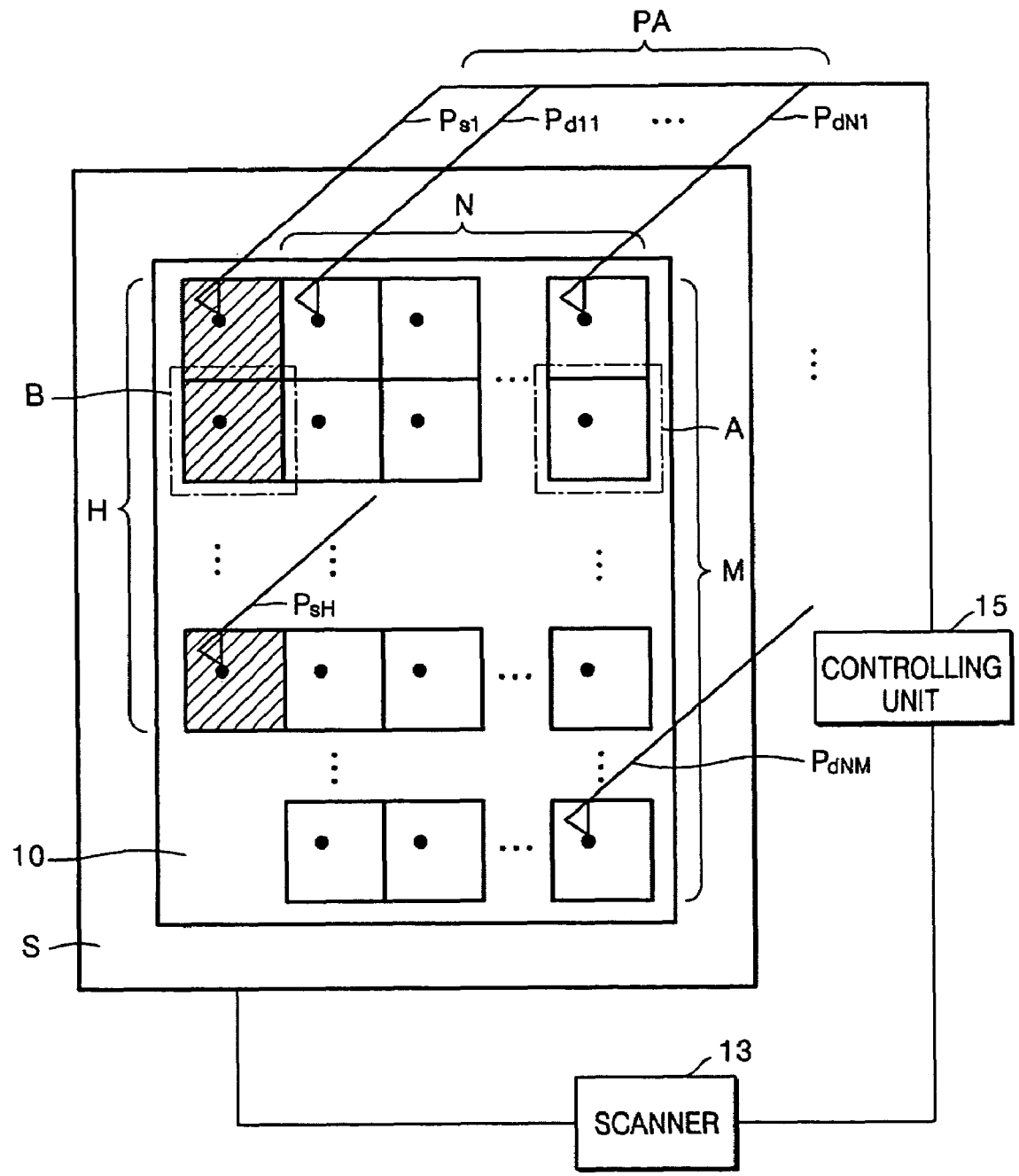
FIG. 1A is a block diagram of a position detection system according to a first embodiment of the present invention.
Figure 1B:
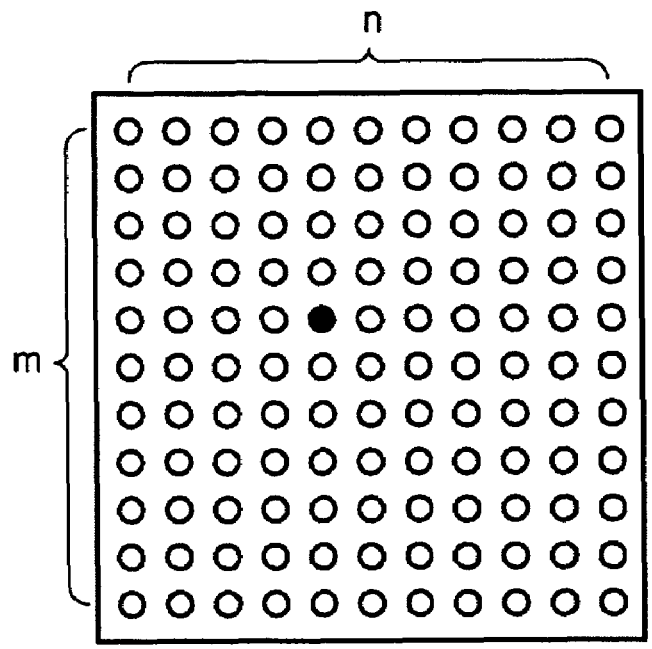
FIG. 1B is an expanded view of a data field A of a recording medium shown in FIG. 1A.
Figure 1C:
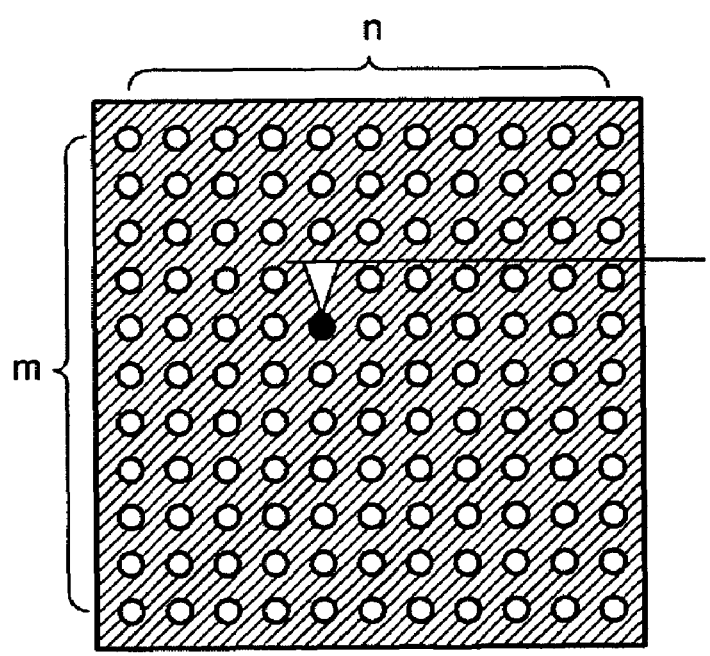
FIG. 1C is an expanded view of a servo field B of the recording medium shown in FIG. 1A.

FIG. 1A is a schematic block diagram of a position detection system according to a first embodiment of the present invention, FIG. 1B is an expanded view of a data field A of a recording medium shown in FIG. 1A, and FIG. 1C is an expanded view of a servo field B of the recording medium shown in FIG. 1A.

Referring to FIG. 1A, a recording medium 10 includes N×M data fields (non-hatched part) and H servo fields (hatched part). A data field includes n×m data bits, as shown in FIG. 1B, and a servo field includes n×m servo bits, as shown in FIG. 1C.

The recording medium 10 includes a probe array PA, which includes N×M data probes $P_{d11}, P_{d21}, \ldots, P_{dN1}, P_{d12}, \ldots, P_{dNM}$ that respectively scan the N×M data fields and record or reproduce the data bits, and H servo probes $P_{s1}, \ldots, P_{sH}$ that scan the servo fields and detect the servo bits. The recording medium is disposed on a stage S, which is connected to a scanner 13 so as to be operated by a signal output from a controlling unit 15. The scanner 13 can also operate the probe array PA instead of the stage S by connecting the scanner 13 to the probe array PA.

In the data storage apparatus, which records or reproduces data on the recording medium 10, position information of desired data is detected and data is recorded using the servo probes ($P_{s1}, \ldots, P_{sH}$) by the following process.

A position information signal (servo code signal) of first bit is received from the servo field via the H servo probes $P_{s1}, \ldots, P_{sH}$. The N×M data probes $P_{d11}, P_{d21}, \ldots, P_{dN1}, P_{d12}, \ldots, P_{dNM}$ can be moved to desired data bits at the N×M data fields when the scanner 13 operates according to the servo code signal to move the stage S. When the N×M data probes $P_{d11}, P_{d21}, \ldots, P_{dN1}, P_{d12}, \ldots, P_{dNM}$ are over the desired data bits of the N×M data fields, the bit on that position is recorded according to a data recording signal received from the controlling unit 15.

Similarly, when the data bit recorded in the recording medium 10 is reproduced, the position information of the data bit is identified from the bit codes, which are received from the H servo probes $P_{s1}, \ldots, P_{sH}$, and the N×M data probes $P_{d11}, P_{d21}, \ldots, P_{dN1}, P_{d12}, \ldots, P_{dNM}$ are moved to the desired position to reproduce the data bit. The probe array PA can be operated instead of the stage S to record/reproduce the information to/from the recording medium 10. The number of the servo probes $P_{s1}, \ldots, P_{sH}$ or the number of servo fields, H, satisfies equation 1. A process of calculating the number of the servo probes $P_{s1}, \ldots, P_{sH}$ and the servo fields will be described as follows.

$$H \geq \log_2(n \times m) \tag{1}$$

Figure 2A:
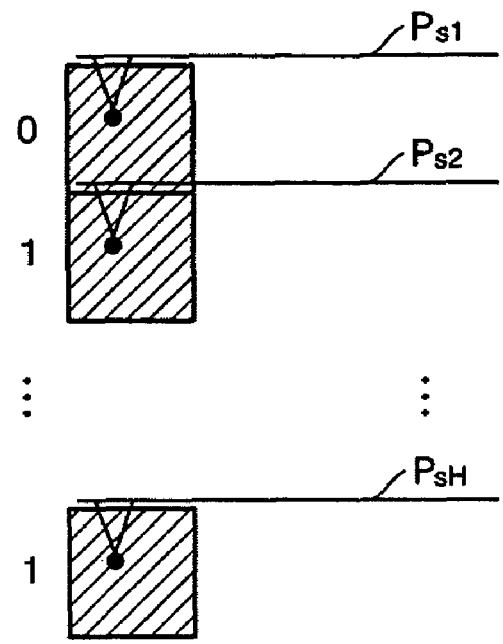
FIGS. 2A and 2B illustrate representation of positions of n×m data bits by an H number of probes.
Figure 2B:
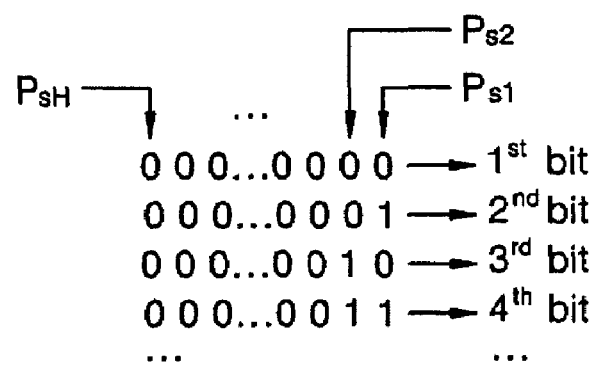

FIGS. 2A and 2B illustrate a representation of positions of n×m data bits by the H servo probes $P_{s1}, \ldots, P_{sH}$. Referring FIG. 2A, when the H servo probes $P_{s1}, \ldots, P_{sH}$ are sequentially arranged on H servo fields and a binary number 0 or 1 is detected by each of the probes, $2^H$ different servo codes can be represented.

For example, if 0 is detected in each of the H servo probes $P_{s1}, \ldots, P_{sH}$, the servo code is $0, \ldots, 0$, and represents the first data bit of the n×m data bits. Likewise, if 1 is detected by the first probe $P_{s1}$ and 0 is detected by the second through H-th probes $P_{s2}, \ldots, P_{sH}$, the servo code is 0,0, 0, . . . , 0,1 and represents a second bit of the n×m bits. A servo code is allocated to each of the data bits in this way.

Therefore, H probes can determine positions of $2^H$ bits using H servo fields, and positions of all data bits on the data field can be represented by H servo probes and H servo fields if H satisfies equation 1.

Figure 3A:
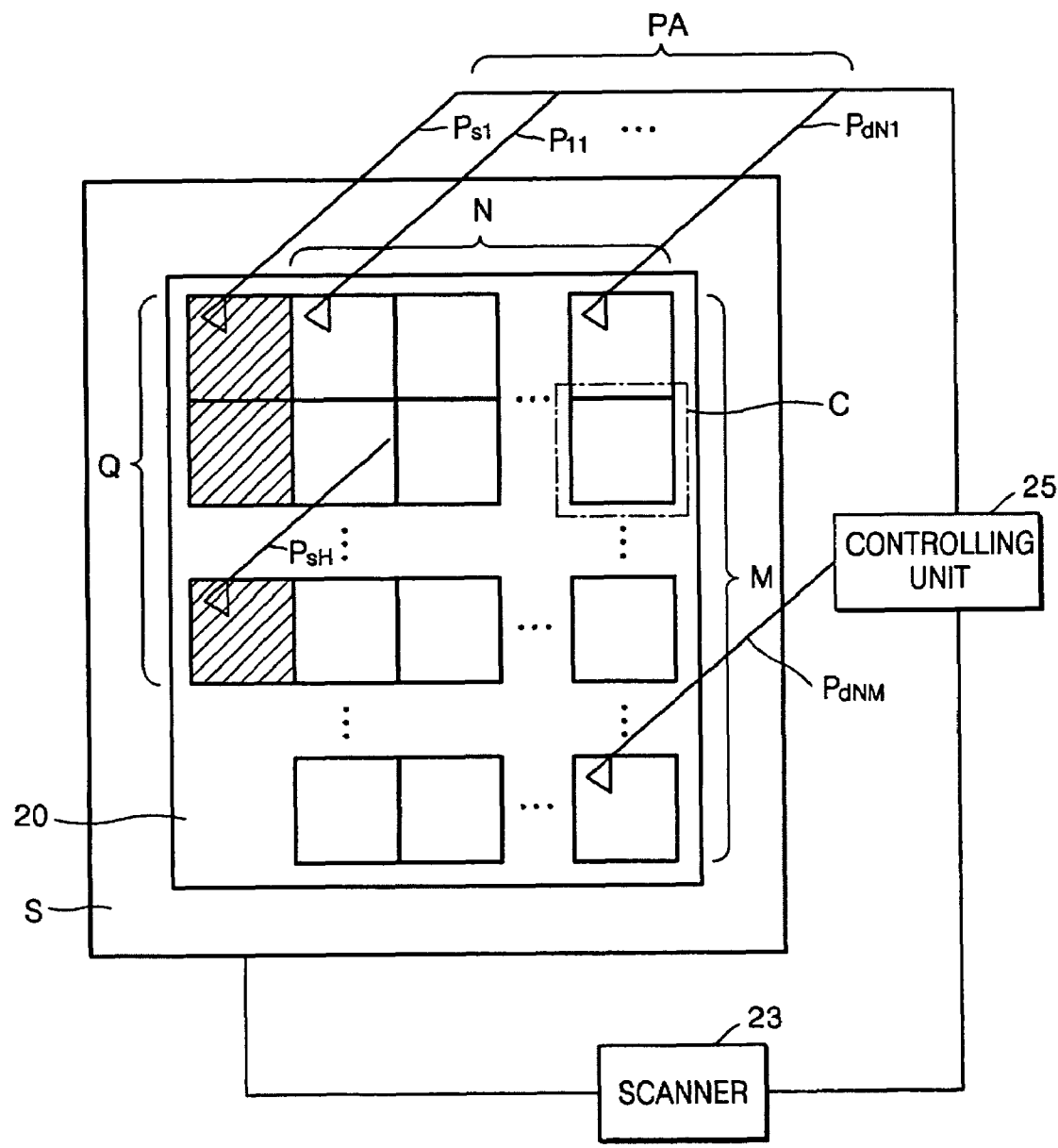
FIG. 3A is a schematic block diagram of a position detection system according to a second embodiment of the present invention.
Figure 3B:
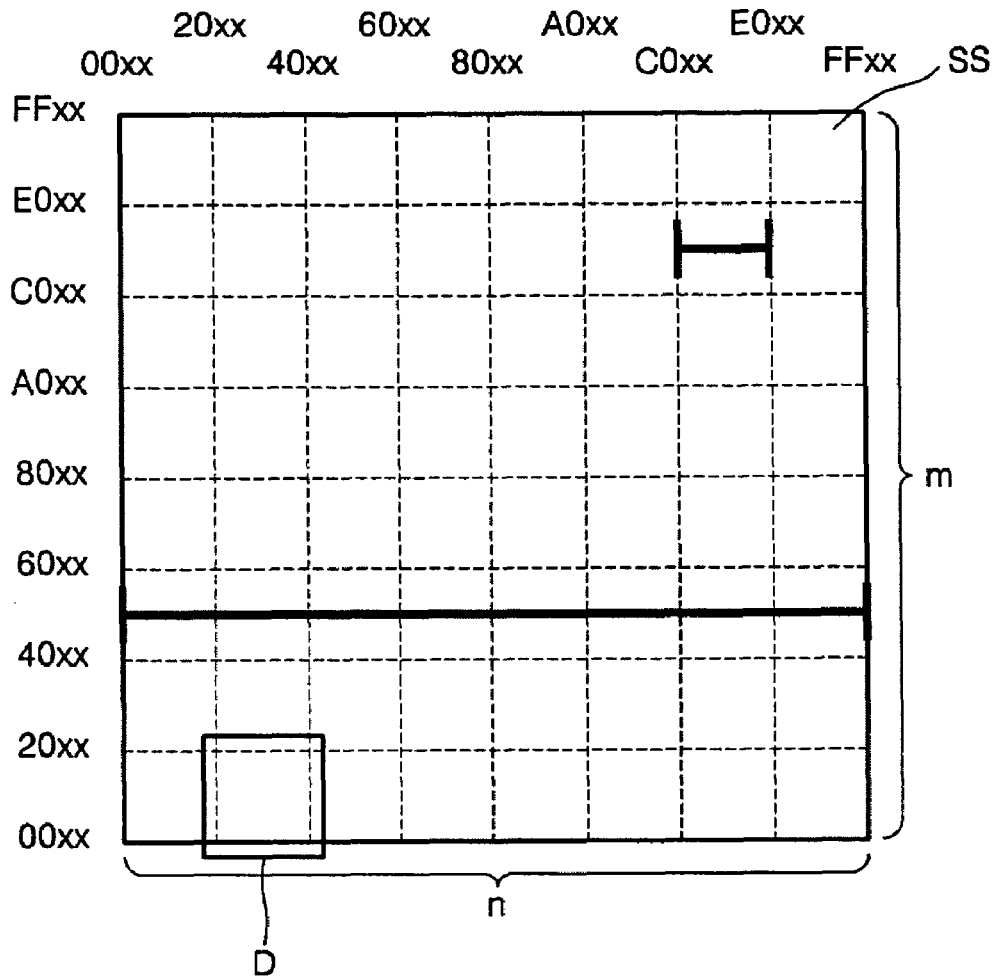
FIG. 3B is an expanded view of a data field C of a recording medium shown in FIG. 3A.
Figure 3C:
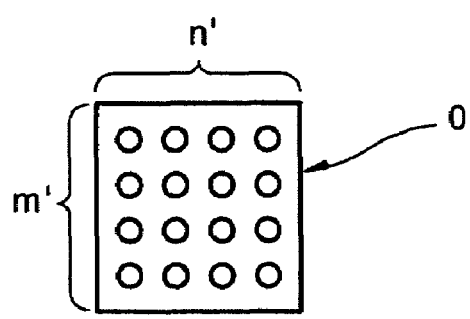
FIG. 3C is an expanded view of a virtual data subsection D of the field shown in FIG. 3B.

FIG. 3A is a schematic block diagram of a position detection system according to a second embodiment of the present invention, FIG. 3B is an expanded view of a data field C of a recording medium shown in FIG. 3A, and FIG. 3C is an expanded view of a virtual data subsection D of the field in FIG. 3B.

The position detection system of the second embodiment of the present invention uses driving information output from a scanner 23 to detect exact position information with fewer servo probes than that of the position detection system according to the first embodiment of the present invention.

Referring to FIG. 3A, the position detection system according to the second embodiment of the present invention includes a recording medium 20 including N×M data fields (non-hatched part) and Q servo fields (hatched part), and a probe array (PA) including a plurality of servo probes ($P_{s1}, \ldots, P_{sQ}$) that scan the servo fields of the recording medium 20 to detect position information and a plurality of data probes ($P_{d11}, P_{d21}, \ldots, P_{dN1}, P_{d12}, \ldots, P_{dNM}$) that scan the data fields of the recording medium 20 to record/reproduce data information. The probe array PA is operated by the scanner 23, or a stage (S) supporting the recording medium 20 is operated by the scanner 23, thereby placing the servo probes and the data probes in the proper positions. A controlling unit 25 outputs a driving signal to the scanner 23 and receives the position information output from the servo probes to transmit a signal for recording or reproducing the data information. The number of servo fields is Q, which satisfies equation 2, and a process of calculating Q will be described as follows.

$$Q \geq \log_2(n' \times m') = \log_2(n \times m) - r \qquad (2)$$

Referring to FIG. 3B, if a data field of the recording medium is divided into $2^r$ virtual data subsections SS corresponding to higher r bit, and the data probes $P_d$ scan the virtual subsections SS, the number Q of servo probes that detect the position information in the recording medium 20 satisfies equation 2. Since Q is less than H, that are fewer servo fields formed on the recording medium 20 is and fewer servo probes.

That is, the position detection system includes the recording medium that includes N×M data fields, which are divided into a plurality of virtual subsections SS, and Q servo fields, and the probe array PA that includes N×M data probes scanning the data fields and Q servo probes. The operation of the controlling unit 25 and the scanner 23 is similar to that of the controlling unit 15 and the scanner 13 shown in FIG. 1A.

Figure 4A:
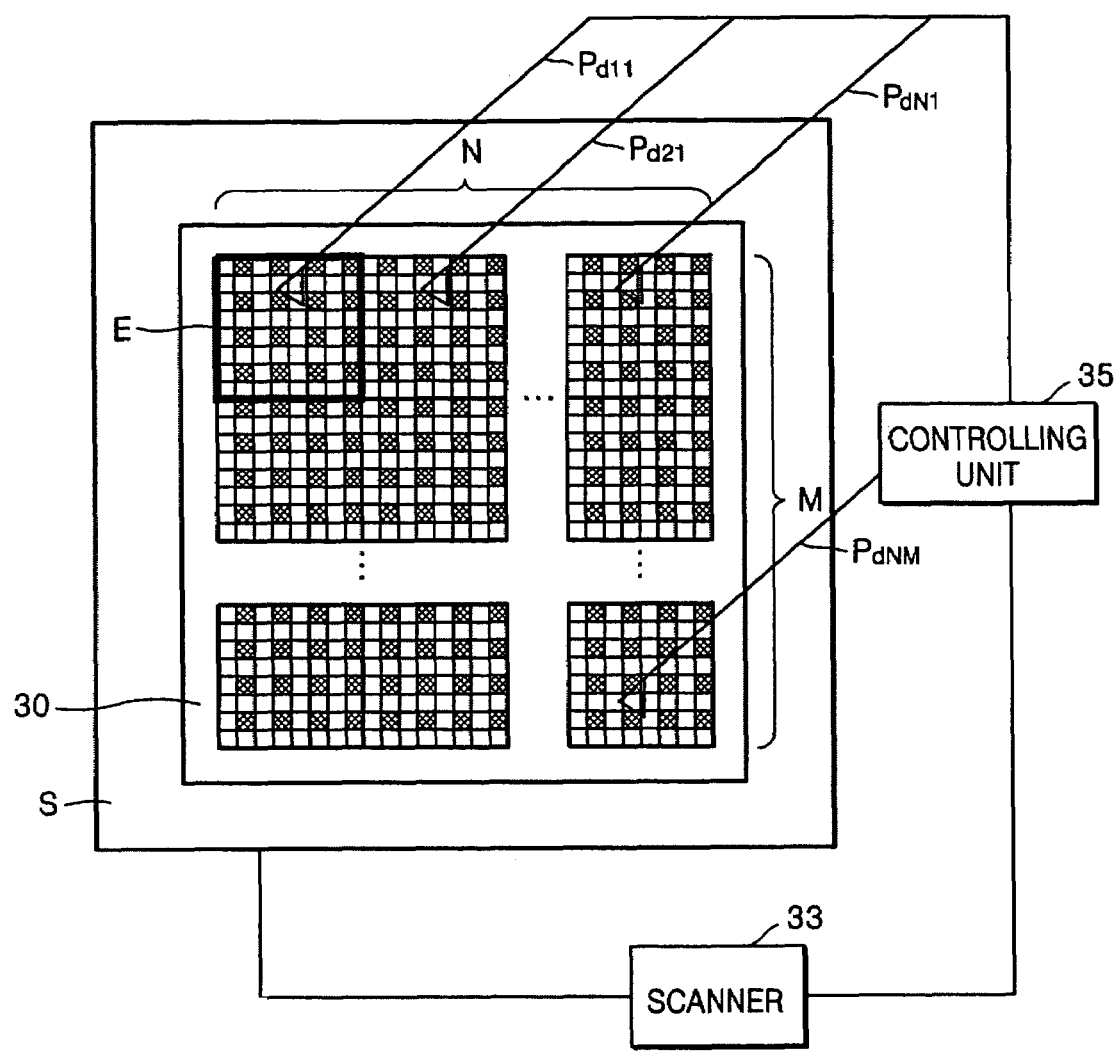
FIG. 4A is a schematic block diagram of a position detection system according to a third embodiment of the present invention.
Figure 4B:
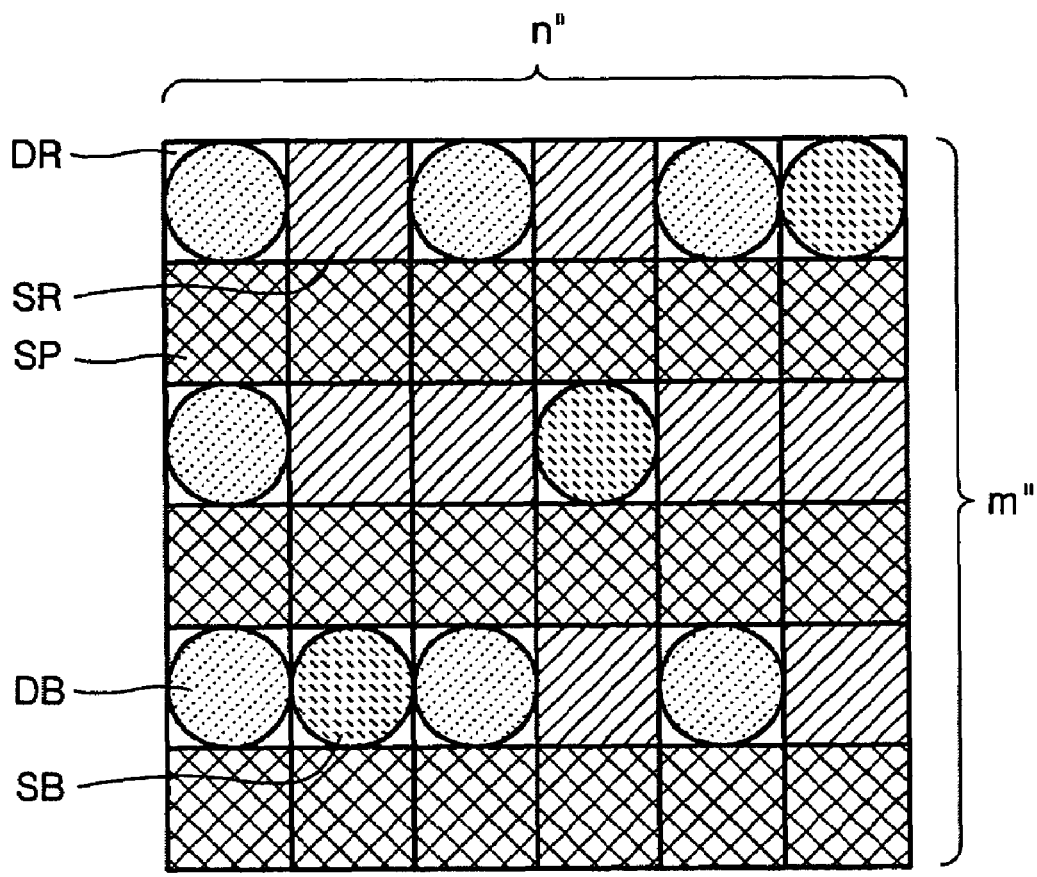
FIG. 4B is an expanded view of a data field E shown in FIG. 4A.

FIG. 4A is a schematic block diagram of a position detection system according to a third embodiment of the present invention, and FIG. 4B is an expanded view of a data field E of a recording medium shown in FIG. 4A.

Referring to FIGS. 4A and 4B, the position detection system according to the third embodiment of the present invention includes a recording medium that includes a data field, in which data regions DR having data bits DB and servo regions SR having servo bits SB are formed. The servo bits SB in the servo regions SR are detected using a data probe P.

The recording medium 20 includes N×M data fields, and each of the data fields includes one of the data regions DR and one of the servo regions SR. Each of the data fields is divided into n"×m" subsections, and the subsection includes one of the data regions DR, one of the servo regions SR, and a spacer SP. The spacer SP contains no information. Bit lines, on which the data bits and the servo bits are arranged, and spacer lines which prevent interference between bit lines, are alternately arranged in rows of the subsection. In addition, the data regions DR, on which the data bits DB are recorded, and the servo regions SR, on which the servo bits SB are recorded, are arranged in columns of the bit lines.

Each of the n"×m" subsections include n×m data regions DR and R servo regions SR. Since each bit that can be detected from a servo region has a value of 1 or 0, the number of servo codes that can be detected from the R servo regions SR is $2^R$, where equation 3 is satisfied.

$$R \geq \log_2(n'' \times m'') \qquad (3)$$

In the position detection system according to the third embodiment of the present invention, additional servo fields are disposed on the recording medium and a predetermined number of servo probes larger than the number of the data bits DB are disposed, thereby detecting the position information of the data bits by one-to-one correspondence. Also, the data probe performing as the servo probe, uses a medium, which is the same as the recording medium as the servo medium, having the same recording/reproducing principles as those of the recording medium, thereby easily correcting an error.

Figure 5A:
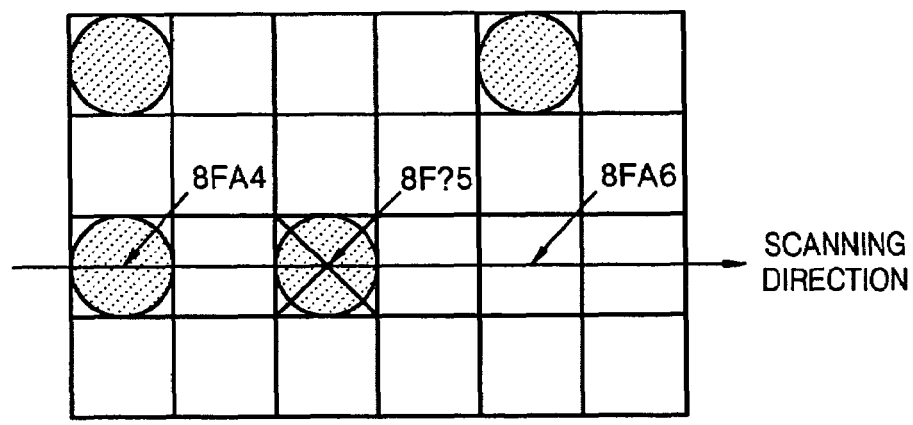
FIG. 5A illustrates principles of correcting an error of a servo code.
Figure 5B:
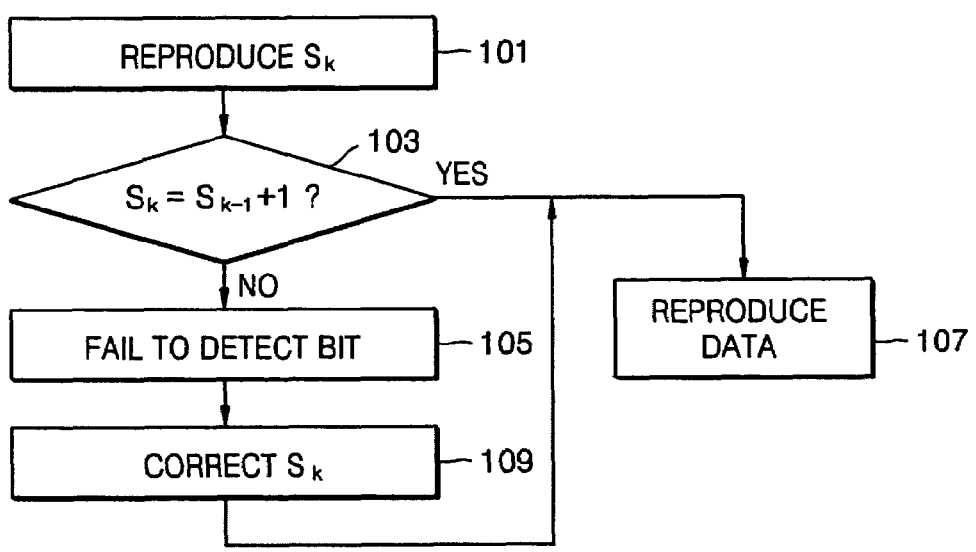
FIG. 5B is a flow chart of an algorithm for correcting the error.

FIG. 5A illustrates principles of correcting an error of the servo code, and FIG. 5B is a flow chart of an algorithm for correcting the error.

Referring to FIG. 5A, if the servo probe moves in a scanning direction to detect a servo code 8FA4 from the first servo bit, and detect a servo code 8F?5 including an error from the second servo bit, the error can be determined from the previous servo code. In order to correct the error of the servo code, the error correcting algorithm shown in FIG. 5B is performed.

Referring to FIG. 5B, when the servo probe reproduces a k-th servo code $S_k$ while scanning the servo field (step 101), it is determined whether the k-th servo code $S_k$ corresponds to the servo code after the k-1th servo code $S_{k-1}$ (step 103). If the k-th servo code $S_k$ corresponds to the servo code $S_{k-1}+1$, that is, the next servo code of $S_{k-1}$, the data bit of the k-th servo code $S_k$ is reproduced (or recoded) (step 107). If $S_k$ does not correspond to the servo code $S_{k-1}+1$, a signal representing servo bit detection error is transmitted to a controlling unit (step 105) to correct the signal for the k-th servo code $S_k$ (step 109), thus detecting an exact servo signal.

Figure 6A:
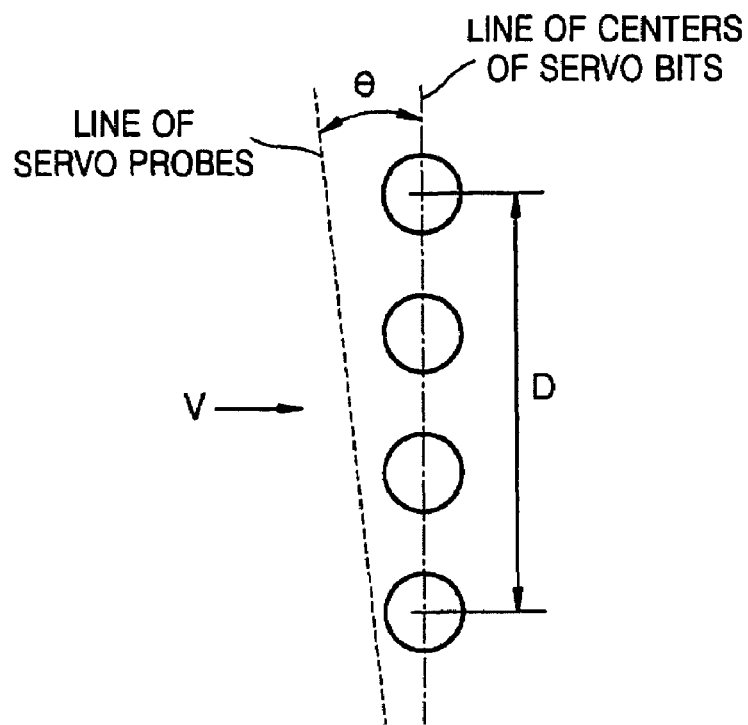
FIG. 6A illustrates a situation in which a tilt-error of the servo probe occurs.
Figure 6B:
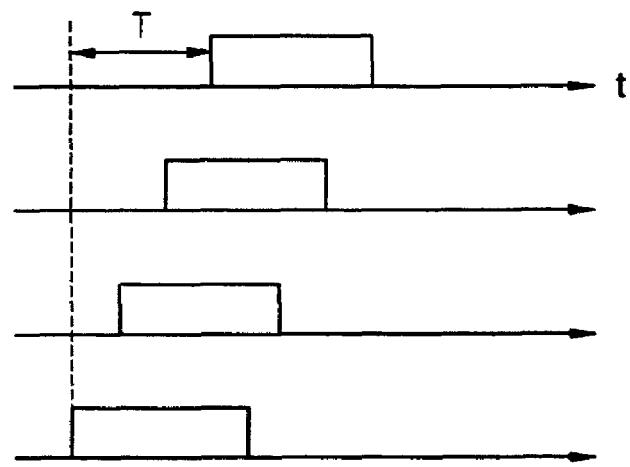
FIG. 6B illustrates signals asymmetrically generated due to the tilt error illustrated in FIG. 6A.

FIG. 6A illustrates a situation in which a tilt error of the servo probe occurs, and FIG. 6B illustrates servo signals generated when the servo probe is tilted. Referring to FIG. 6A, a line along the servo probes is tilted at an angle of θ to a line along centers of the servo in the case where the servo bits are arranged in a row. If four servo probes scan the servo bits with a scan speed V, servo pulses detected from the servo bits are sequentially detected as shown in FIG. 6B. Therefore, the time at which the servo pulse detected from the fourth servo bit is delayed by T from the time at which the servo pulse detected from the first servo bit. Therefore, the tilt error generated due to a mechanical defect of the servo probe can be determined by detecting delays in the servo signals of the servo bits as shown in FIG. 6B.

As described above, according to the exemplary embodiments of the present invention, the exact position of the data bit can be detected by detecting the absolute position of the data bit using SPM technology, and an error in the servo code can be easily corrected.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A position detection system of a data storage apparatus, the position detection system comprising:
   a recording medium including a plurality of data fields and H servo fields where (n×m) data bits are formed on at least one data field; and
   a probe array including a plurality of data probes that scan the data fields to detect information and H servo probes that scan servo fields,
   wherein each of the data fields includes n×m data bits and H satisfies $$H \geq \log_2(n \times m).$$

2. The system of claim 1, wherein each of the servo fields includes n×m servo bits.

3. A position detection system of a data storage apparatus, the position detection system comprising:
   a recording medium including a plurality of data fields and Q servo fields where a data field, on which (n×m) data fields are formed, is divided into $2^r$ virtual subsections and accordingly, (n'×m') data bits are allocated to each of the virtual subsections; and
   a probe array including a plurality of data probes that scan the data fields to detect information and Q servo probes that scan the servo fields, wherein each of the data fields includes n×m data bits and is divided into $2^r$ virtual subsections that include n'×m' data bits, and Q satisfies $$Q \geq \log_2(n' \times m') = \log_2(n \times m) - r.$$

4. The system of claim 3, wherein each of the servo fields includes n'×m' servo bits.

5. A position detection system of a data storage apparatus, the position detection system comprising:
   a recording medium including a plurality of data fields; and
   a probe array including a plurality of data probes that scan the data fields to detect information,
   wherein each of the data fields includes data regions, in which data bits are formed, and servo regions, in which servo bits are formed, and each of the data probes scans the data fields to detect the data bits and the servo bits.

6. The system of claim 3, wherein each of the data fields comprises:
   bit lines on which the data regions and the servo regions are disposed; and
   spacer lines disposed between adjacent pairs of the bit lines to prevent interference of information between the bit lines.

7. The system of claim 5, further comprising a stage that supports the recording medium.

8. The system of claim 7, further comprising a scanner that operates the stage.

9. The system of claim 5, further comprising a scanner that operates the probe array.

10. The system of claim 7, further comprising a controlling unit, which transmits a control signal to the scanner in response to a servo code detected by the servo probe.

11. A position detection method performed by a position detection system, which includes a recording medium including a plurality of data fields, each of which includes n×m data bits, and a probe array including a plurality of data probes that scan the data fields to detect information, the method comprising:
   (a) forming H servo fields in the recording medium, and disposing H servo probes that scan the servo fields in the probe array;
   (b) detecting a servo code, which represents information about a position of each of the data fields, from the servo field using the servo probe; and
   (c) moving the data probes to a position on the data field that corresponds to the servo code,
   wherein H satisfies $$H \geq \log_2(n \times m).$$

12. The method of claim 11, wherein each of the servo fields includes n×m servo bits.

13. A position detection method performed by a position detection system, which includes a recording medium including a plurality of data fields, each of which includes n×m data bits, and a probe array including a plurality of data probes that scan the data fields to detect information, the method comprising:
   (a) dividing each of the data fields into $2^r$ virtual data subsections such that n'×m' data bits are included in each of the virtual subsections, forming Q servo fields in the recording medium, and disposing Q servo probes that scan the servo fields in the probe array;
   (b) detecting a servo code, which represents information about a position of each of the data fields, from each of the servo fields using the servo probe; and
   (c) moving the data probe to the position on the data field that corresponds to the servo code,
   wherein Q satisfies $$Q \geq \log_2(n' \times m') = \log_2(n \times m) - r.$$

14. The method of claim 13, wherein each of the servo fields includes n×m servo bits.

15. The method of claim 11, wherein step (c) comprises:
   determining whether the servo code follows a previously detected servo code; and
   transmitting position information corresponding to the servo code if the servo code follows the previously detected servo code, and correcting the servo code if the servo code does not follow the previously detected servo code.

16. The method of claim 13, wherein step (c) comprises:
   determining whether the servo code follows a previously detected servo code; and
   transmitting position information corresponding to the servo code if the servo code follows the previously detected servo code, and correcting the servo code if the servo code does not follow the previously detected servo code.

17. A position detection method performed by a position detection system, which includes a recording medium including a plurality of data fields and a probe array including a plurality of data probes that scan the data fields to detect information, the method comprising:
   (a) arranging data regions, in which data bits are formed, and servo regions, in which servo bits are formed, in the data field;
   (b) detecting a servo code, which represents position information on the data region, from each of the servo regions using the data probe; and
   (c) moving the data probe to the position on the data field that corresponds to the servo code.

18. The method of claim 17, wherein step (c) comprises:
   determining whether the servo code follows a previously detected servo code; and
   transmitting position information corresponding to the servo code if the servo code follows the previously detected servo code, and correcting the servo code if the servo code does not follow the previously detected servo code.

19. The method of claim 11, wherein if the servo probe generates non-simultaneous signals, it is determined that a tilt error has occurred.

20. The method of claim 13, wherein if the servo probe generates non-simultaneous signals, it is determined that a tilt error has occurred.

21. The method of claim 17, wherein if the servo probe generates non-simultaneous signals, it is determined that a tilt error has occurred.

* * * * *